Patented Sept. 26, 1944

2,359,166

UNITED STATES PATENT OFFICE 2,359,166

PLASTIC COMPOSITION AND PROCESS FOR PREPARING THE SAME

Leonard Smidth, New York, N. Y.

No Drawing. Application August 17, 1942,
Serial No. 455,120

14 Claims. (Cl. 260—9)

This invention relates to acid-curing synthetic resin compositions containing a latent curing catalyst and to a process for preparing and using such compositions.

The prerequisites of an ideal latent curing catalyst, for example, when used with a urea-formaldehyde molding composition, are as follows: (a) the catalyst should be relatively stable at ordinary temperatures and temperatures below the ordinary curing temperatures of the synthetic resin for a substantial period of time; (b) such catalyst should be preferably substantially neutral, or only slightly acid or slightly basic at ordinary temperatures, but upon heating it should release or produce an acid or acidic substance; (c) the catalyst should be initially substantially colorless in order not to obscure the true color of the resins or the color of any pigment that may be added; (d) the catalyst should be capable of being uniformly incorporated in the resinous material.

The latent curing catalyst of the invention may be considered as an accelerator, which upon heating becomes activated to release or produce an acid or an acidic substance for advancing the reaction of the incompletely-reacted acid-curing synthetic resin compositions. The term "latent catalyst" or "latent curing catalyst" as used in the art defines substances which are relatively stable, and which are neutral or only slightly acid or basic at atmospheric temperatures, but which become activated at a curing temperature to produce a substance having acidic properties.

It is a general object of the present invention to provide a latent curing catalyst for incompletely-reacted synthetic resin compositions, which catalyst will be relatively stable at ordinary atmospheric temperatures, and otherwise substantially fulfill the requirements of an ideal latent curing catalyst.

It is a more specific object of the present invention to provide a process in which an incompletely-reacted acid-curing urea-formaldehyde composition is combined with a latent catalyst, which catalyst becomes acidic upon heating to elevated temperatures and which can be uniformly incorporated with said composition.

Another object of the invention is to provide a latent curing catalyst for curing urea-formaldehyde reaction products which will be simple to incorporate, stable until the reaction products are cured, and which will not discolor the resins produced.

It is a further object of the invention to provide an incompletely-reacted acid-curing resin composition comprising a latent curing catalyst and which is adapted for a wide variety of uses.

Still another object is to provide a composition and process for producing a homogeneous molded product by subjecting a molding composition of the class described to the combined action of heat and pressure.

Further objects include improved processes of producing a synthetic resin composition containing a latent catalyst.

Other objects of the invention will in part be obvious and will in part appear hereinafter.

I have discovered that the prerequisites of a latent catalyst are possessed by the salts of chloroacetic acid. According to the academic studies of Kastle and Keiser, American Chemical Journal, 15, 471 (1893), and other investigators, salts of halogen-substituted acetic acid, such as chloroacetic and bromoacetic acid hydrolyze to give the metallic halide and the corresponding hydroxy carboxylic acid. It is probable that the curing action of such substances is due to the free acid liberated, but partial hydrolysis of the metallic salts so produced may aid the catalysis. The above theory is offered as an explanation only, and I do not wish to be limited thereby.

For purposes of illustration, the present invention will be described with reference to acid-curing synthetic resins selected from the class consisting of those formed of condensation of aldehydes, such as formaldehyde, acetaldehyde, propionaldehyde, crotonaldehyde, benzaldehyde, furfural and the like, with amines or amides, such as urea, thiourea, guanidine, methyl urea, acetyl urea, melamine, cyanamide, dicyanodiamide, biuret, semi-carbazide, aniline and derivatives of aniline.

By way of illustration, the invention will be particularly described with reference to reaction products formed of urea and formaldehyde which are characterized by requiring the presence of an acidic substance at elevated temperatures to advance the condensation and/or polymerization.

In accordance with the present invention there is provided a urea-formaldehyde molding composition containing a latent catalyst comprising a salt of chloroacetic acid which is a potentially acidic substance. Cellulose material may be added to or combined with the molding composition as hereinafter described.

The essential part of my invention is to carry out the reaction at such a temperature that the easily decomposed potentially acidic substance will not become acid or too acid before being subjected to heat and pressure. The low temperature of the reaction and drying process represses the formation of acidic substances (i. e., represses hydrolysis), while the high temperature of the hot molding operation increases the production of the acid substances. Substances which I have found to be particularly useful in this connection are the salts of chloroacetic acid.

The expression "incompletely-reacted urea-formaldehyde composition," as used in the specification and appended claims with reference to resinous materials which are capable of further curing, is intended to include any such product in a state prior to complete polymerization, as simple addition products or condensation products thereof.

The invention accordingly comprises a composition possessing the characteristics, properties and the relation of components capable of forming final hardened resins, the process involving the several steps and the relation of the steps with respect to each other and the final hardened product possessing the features, properties and the relation of components as will be exemplified in the following detailed description, and the scope of the invention will be indicated in the claims.

There may be employed as the latent catalyst such salts of chloroacetic acid as may be formed of organic bases, ammonia and its derivatives, metals such as sodium, potassium, magnesium, calcium, aluminum, zinc, lead, mercury, and the like. In the preferred embodiment the latent catalyst comprises a metallic salt of mono- and di-chloroacetic acid.

The urea-formaldehyde resin has been stated to combine with cellulose to produce what was designated as a glucanure, and the present invention includes a molding composition comprising such glucanure and a small proportion of a salt of chloroacetic acid.

By submitting this molding composition after it has been dried to the combined action of heat and pressure in the presence of the latent catalyst, as, for instance, by utilizing the well-known molding process and apparatus common in the art of molding phenol-formaldehyde compositions, the cellulose material apparently forms a glucanure with the condensation product and becomes an integral part thereof. The cellulose material greatly increases the strength and durability of the molded product. This molded product remains translucent even when the amount by weight of the cellulose material is more than one-half of the whole product. The combined action of heat and pressure in the molding operation causes the product to become quickly homogeneous.

Among the factors which enter into the formation of the final hardened product using such latent catalysts, the most important factor is the proportion of the catalyst present which is converted to an acidic substance, which proportion is determined by the temperature to which the mixture is heated. The salts of chloroacetic acid as a class do not decompose to any material extent at temperatures substantially below resin-molding temperatures during the short interval of time employed in conventional molding operation, i. e., between the commencement of the molding operation and the completion of the flow. Instead of selecting a particular salt which will completely decompose at the curing temperature employed, one may use a larger quantity of any such salt which decomposes partially at a lower temperature provided the "flow" of the composition in the mold is not impaired. In general, in order to obtain the same degree of acidity, a larger quantity of any particular salt is required when subjecting the mixture to lower temperatures as compared to higher temperatures, and vice versa. Other factors include the specific salt employed, the pH required during curing and the degree of polymerization desired in the final product.

In compositions to be used in molding the latent catalyst may be a salt which substantially completely decomposes to release an acidic substance at a temperature between 120° C. and 160° C. or alternatively one may use a larger quantity of a salt which partially decomposes at a lower temperature. In forming castings, coatings and laminates with urea-formaldehyde reaction products, there may be employed salts which decompose to liberate an acidic substance under the conditions of temperature and/or pressure employed in forming such products.

For example, in laminating wood veneers by "hot" pressing with an adhesive composition comprising a urea-formaldehyde condensation product containing a small amount of the latent catalyst, there may be employed a salt which substantially completely decomposes at about 80° C. to 145° C. or a larger quantity of one which partially decomposes at a lower temperature. In laminating wood veneers at lower elevated temperatures referred to as "cold" pressing operations, wherein comparatively more moisture is present in the adhesive, there may be used larger quantities of the proper salt. In using acid-curing type synthetic resins as adhesives it is preferred to employ the ammonium salt of chloroacetic acid as the latent catalyst. In this case the moisture acts to break down the salt over a period of time at the lower temperature and produce a better bond than without the catalyst being present.

For use in forming castings requiring up to three days curing, there may be employed as a latent catalyst a salt substantially completely decomposing at about 60 to 80° C., or a larger quantity of one which decomposes partially at a lower temperature.

For creaseproofing textile materials with a dilute aqueous solution of a substantially neutral urea-formaldehyde condensation product, there is employed in such solution a salt which decomposes completely at about 120° C. to 160° C. or a larger quantity of one which partially decomposes at a lower temperature.

In treating textile materials, it is often desirable to treat with a solution comprising the latent catalyst, thereafter treating the textile with an acid-curing type synthetic resin and passing the treated textile through hot rollers to decompose the salt and cure the resin in situ.

Several factors which lead to my preferred molding composition and molded product are as follows:

A lower proportion of formaldehyde than that generally preferred in the prior art is used, and thus a more water resistant product is obtained; paper or other cellulosic material is used; and high plasticity of the molding composition is obtained by a comparatively low extent of reaction.

Different methods may be employed in mixing the proportions of urea and formaldehyde and cellulose material, among which are, for example, the following:

*Method 1.*—Urea and formaldehyde may be reacted in aqueous solution, and the solution used as an impregnating medium for the cellulose material.

*Method 2.*—An excess of formaldehyde may be reacted with the urea, and additional dry urea added to the dried molding composition containing cellulose material.

*Method 3.*—Urea may be gradually added to a formaldehyde solution until the desired proportion is reached, and then combined with cellulose material.

*Method 4.*—A urea rich urea-formaldehyde solution may be added to a formaldehyde rich urea-formaldehyde solution or vice versa, and then combined with the cellulose material.

*Method 5.*—Formaldehyde may be added to molten urea or a solution of urea until the required proportion is reached, and the mixture then combined with the cellulose material.

In my prior applications I have disclosed the use of a preferred range of 1.05–1.40 mols of urea to 2 mols of formaldehyde, but a product having greater resistance to water and solvents is formed by reacting 1.33 mols of urea with 2 mols of formaldehyde. Other ratios on either side can be used to give products of commercial value.

In my application No. 242,520 (now U. S. Patent No. 1,893,911) I have shown how to obtain a clear, transparent product by adding urea in a proportion greater than 1.1 mols of urea to 2 mols of formaldehyde. The ability of the product to transmit ultraviolet light and the weather resistance increased as the proportion of urea increased, until there was reached a maximum of 1.33 mols of urea to 2 mols of formaldehyde. When the above product (i. e., one containing from 1.1–1.33 mols of urea to 2 mols of formaldehyde) was combined with a cellulose material, such as paper, paper pulp, alpha cellulose, cotton, sawdust, linters, cloth and the like, the objections ascribed to the prior compositions were overcome. The molding composition could be made so that it readily flowed in the hot mold without blistering, and the molded product produced was strong, noninflammable, translucent and resistant to weathering and boiling water.

Commercial formaldehyde usually contains enough formic acid to give it a pH of approximately 3.0. The presence of any acid in a urea-formaldehyde mixture catalyzes the reaction, the speed of the reaction being in proportion to the acidity or the pH of the solution. Reaction in a mixture of urea and formaldehyde having a pH of 3.0 usually goes so fast that the products are inferior and often worthless. In order to prevent the reaction from proceeding too rapidly the acidity is controlled and maintained at a given pH usually between 5 and 7.

I may carry out the process employing strong bases simply by first neutralizing the solution with NaOH or KOH, then adding the latent catalyst which while not strongly acid in itself (or which may be neutralized if necessary), but which becomes acidic on being placed in the mold under heat and pressure.

I have found that the ideal molding composition is one which is neutral or slightly acidic; during molding the composition should have a pH value between 6 and 7, preferably 6.5, but never less than 5.8. If the pH of the molding composition is less than 5.8 it will tend to become stiff on standing prior to molding. If the pH value is greater than 7 the composition will not cure as rapidly in the mold, although a pH greater than 7 does not appreciably affect the stability of the composition prior to molding.

The composition containing the latent catalyst is finally subjected to the action of heat and pressure in the mold, for example, at a temperature between 125° C. and 180° C., whereby the latent catalyst is decomposed and polymerization is advanced.

In the preparation of molding compositions the process of drying is very important. If a molding composition is not sufficiently dry before being placed in a pebble mill or other grinding apparatus it may cause trouble by "gumming up" in the mill. On the other hand, if it is dried too far it will not "flow" properly in the mold. The method of drying by blowing air, or other inert gases through the mixture is preferred.

Although it is desirable to have the molding composition on the acid side because the cure in the mold is shortened, a neutral or basic molding composition may be dried by blowing air through it and later made acidic during the grinding process.

I have discovered that a superior molding composition can be obtained by partially drying a urea-formaldehyde product containing the latent catalyst in the presence of a suitable "support," such, for example, as cellulosic materials such as paper, cotton, and the like, or inert materials such as asbestos or any broken solid substance as pear shell chips or flakes, at normal temperatures, thereafter heating the composition to complete the drying operation. By this partial drying operation before the heat is applied, the amount of water in the composition is materially decreased and the composition thus rendered less sensitive to the action of heat during the drying operation, even though a comparatively large amount of the acid catalyst may be present.

In practice, the catalyst-containing urea-formaldehyde condensation product in the presence of the desired "support" is subjected to a blast of air or other inert gas at a normal temperature, say, below 50° C. by passing the air or other inert gas over or through the composition until the composition is partially dried. The partially dried composition may be thereafter subjected to the action of heat to complete the drying operation.

The heat generated by the reaction during the drying operation aids the evaporation of the water present and thus reduces the time of drying. Furthermore, by carrying out the reaction during the drying process water is taken off as the reaction proceeds; it appears that the less water there is present the more stable the composition during drying.

I have discovered a method whereby a uniform condensation product of great strength and durability may be obtained in a very simple way; namely, in producing a molding composition by the reaction of urea and formaldehyde at low temperatures, i. e., below boiling and preferably below 75° C., by carrying out the greater part, or all, of the reaction between urea and formaldehyde in the presence of a filler and preferably in the presence of the latent catalyst during the drying operation.

The following example is given to illustrate the invention, but the invention is not to be considered as limited to the example.

*Example.*—1.25 mols of urea were mixed with 2 mols of formaldehyde (40% by volume aqueous commercial formalin) and sufficient ammonia or other strong base added to adjust the hydrogen ion concentration of the solution to a pH of 6.5. The mixture was then heated to about 30° C. and maintained at that temperature for about 30 minutes. There was then added to the solution approximately ½% by weight (based upon the dry weight of the resin and paper) of a sodium salt of mono-chloroacetic acid at room temperature, or the solution may be partially or substantially completely dried before adding the latent catalyst. The reaction product was then mixed with comminuted alpha cellulose paper (40% by weight on the dry weight of the urea-formaldehyde), and then sufficiently dried at a low temperature, for example below 50° C., to give a molding composition which has the proper flow in the mold.

Prior to drying and while the composition is still in the liquid form, it is often desirable to partially or completely neutralize the urea-formaldehyde composition if the composition is dried at a low temperature. If the drying is conducted at a higher temperature which is sufficient to partially decompose the latent catalyst present therein, prior to drying the solution is made slightly alkaline to compensate for the acid which will be formed during drying by the decomposition of the latent catalyst, or other substances present which may decompose to form an acidic substance during the step of drying. Alternatively, there may be added an alkaline substance to the composition after drying in order to compensate for any acid present or formed during the drying operation for the purpose of adjusting the dried composition to approximate neutrality.

The dried molding composition produced as described above was then ground to a fine powder in a pebble or ball mill with 0.5% zinc stearate. The composition was then molded at 149° C. for 3 minutes. The molding composition cured to give a molded product with a substantially lower water absorption value when boiled in water compared to an identical product molded under the same conditions but without the addition of the latent catalyst.

One advantage of the low-temperature reaction method is that the urea-formaldehyde condensation product is in the form of a thin liquid, which is easily mixed with the cellulose filler. This is not true of viscous or gelatinized products. If paper is used and impregnated with the thin liquid the moist paper is very absorbent. Thus the impregnated material may be readily broken up and dried without using expensive mixing or masticating operations. Another advantage of the low-temperature reaction process is that the reaction is carried on in such a way that a more potentially-reactive mixture can be used, i. e., more latent catalyst can be present during the reaction and subsequent drying without causing loss of plasticity.

Instead of paper, there may be used other cellulose fillers such as cotton, cotton cloth, silk, rayon, canvas, sawdust, wood flour and the like.

Colored effects may be obtained in the molded product. For instance, the initial condensation product may be colored or the cellulose material may be previously colored and then combined with the urea-formaldehyde condensation product, or the color may be introduced at any time during the process. Vari-colored effects in the molded product may be obtained by coloring two or more batches of the molding composition differently and then combining them under heat and pressure.

A suitable filler, such as asbestos, lithopone, china clay or talc, may be introduced at any time during the process, if so desired.

While I have described my improvement in detail and with respect to certain preferred forms, I do not desire to be limited to such details or forms since, as will be noticed by those skilled in the art, after understanding my invention many changes and modifications may be made and the invention embodied in widely different forms without departing from the spirit and scope thereof in its broader aspects, and I desire to cover all modifications, forms and improvements coming within the scope of any one or more of the appended claims.

This application is a continuation in part of my co-pending application Serial No. 664,208 filed April 3, 1933, which application is a continuation in part of applications Serial Nos. 242,520 (now Patent No. 1,893,911); 363,397 filed May 15, 1929; 422,545 filed January 22, 1930; 429,202 filed February 17, 1930; and 537,998 filed May 16, 1931 (now Patent No. 2,140,560).

Having thus described my invention what I claim as new and desire to secure by Letters Patent is:

1. A composition comprising an incompletely-reacted urea-formaldehyde reaction product combined with a latent catalyst comprising a salt of chloroacetic acid.

2. A composition comprising a glucanure and a salt of chloroacetic acid.

3. A urea-formaldehyde molding composition containing a latent catalyst comprising a salt of chloroacetic acid.

4. A liquid coating composition comprising an incompletely-reacted urea-formaldehyde reaction product combined with a latent catalyst comprising a salt of chloroacetic acid.

5. An aqueous adhesive comprising an incompletely-reacted urea-formaldehyde reaction product combined with a latent catalyst comprising a salt of chloroacetic acid.

6. A composition comprising an incompletely-reacted urea-formaldehyde reaction product combined with a filler comprising an inert non-cellulosic material and a latent catalyst comprising a salt of chloroacetic acid.

7. A molding composition comprising a glucanure and a small proportion of a salt of chloroacetic acid.

8. A process comprising combining an incompletely-reacted urea-formaldehyde reaction product and a latent catalyst comprising a salt of chloroacetic acid.

9. A process comprising combining an incompletely-reacted urea-formaldehyde reaction product and a latent catalyst comprising a salt of chloroacetic acid with a cellulosic material.

10. A process comprising combining an incompletely-reacted urea-formaldehyde reaction product with a latent catalyst comprising a salt of chloroacetic acid, thereafter drying said product at a temperature below that which does not substantially decompose said latent catalyst.

11. A process for forming a resin, the steps comprising combining a urea-formaldehyde reaction product with a latent catalyst comprising a salt of chloroacetic acid which decomposes to an extent at an elevated temperature to liberate an acidic substance, thereafter heating said mixture to an elevated temperature to decompose the latent catalyst thereby producing an acidic substance in situ causing said incompletely-reacted urea-formaldehyde reaction product to form an advanced reaction product.

12. The process comprising reacting from 1.05 to 1.40 mols of urea with 2 mols of formaldehyde to form an incompletely-reacted urea-formaldehyde reaction product, thereafter combining said reaction product with a latent catalyst comprising a salt of chloroacetic acid and heating said mixture to an elevated temperature to decompose the latent catalyst thereby producing an acidic substance in situ causing said incompletely-reacted urea-formaldehyde product to form an advanced reaction product thereof.

13. In a process for forming a molded product, the steps comprising combining an incompletely-reacted urea-formaldehyde reaction product and a latent catalyst comprising a salt of chloroacetic acid which decomposes to an extent at an elevated temperature to liberate an acidic substance with a cellulosic material, heating said mixture to an elevated temperature to produce an acid in situ causing said incompletely-reacted urea-formaldehyde reaction product to form an advanced reaction product.

14. In a process for forming a resin, the steps comprising reacting urea and formaldehyde in acid media to form an incompletely-reacted urea-formaldehyde reaction product, thereafter substantially neutralizing said reaction product by adding a strong base, and combining therewith a latent catalyst comprising a salt of chloroacetic acid.

LEONARD SMIDTH.